(12) United States Patent
Longshore

(10) Patent No.: US 9,629,464 B2
(45) Date of Patent: Apr. 25, 2017

(54) OUTDOOR CUSHION SLIPCOVER SLEEVE

(71) Applicant: Brenda M Longshore, Lake Havasu City, AZ (US)

(72) Inventor: Brenda M Longshore, Lake Havasu City, AZ (US)

( * ) Notice: Subject to any disclaimer, the term of this patent is extended or adjusted under 35 U.S.C. 154(b) by 134 days.

(21) Appl. No.: 14/756,320

(22) Filed: Aug. 26, 2015

(65) Prior Publication Data

US 2016/0066698 A1   Mar. 10, 2016

Related U.S. Application Data

(60) Provisional application No. 62/070,931, filed on Sep. 9, 2014.

(51) Int. Cl.

| | |
|---|---|
| *A47C 31/11* | (2006.01) |
| *A47C 1/14* | (2006.01) |
| *A47C 27/00* | (2006.01) |
| *A47C 7/46* | (2006.01) |
| *B60N 2/60* | (2006.01) |

(52) U.S. Cl.
CPC .............. *A47C 1/14* (2013.01); *A47C 27/005* (2013.01); *A47C 27/008* (2013.01); *A47C 7/46* (2013.01); *A47C 31/11* (2013.01); *B60N 2/60* (2013.01)

(58) Field of Classification Search
CPC .............. A47C 31/11; A47C 7/46; B60N 2/60
USPC ................. 297/228.1, 219.1; 5/490, 491
See application file for complete search history.

(56) References Cited

U.S. PATENT DOCUMENTS

| | | | | |
|---|---|---|---|---|
| 2,759,200 | A * | 8/1956 | Johnston | A47G 9/0253 5/490 |
| 3,241,161 | A | 3/1966 | Dashosh | |
| 3,974,531 | A * | 8/1976 | Van Pelt | A47G 9/0253 5/490 |
| 4,295,235 | A | 10/1981 | Deitz | |
| 4,780,921 | A | 11/1988 | Lahn | |
| 4,843,662 | A * | 7/1989 | Handelman | A47C 7/021 297/183.5 |
| 5,084,928 | A | 2/1992 | Skillington | |
| 5,388,293 | A | 2/1995 | Kistner | |
| 5,572,753 | A * | 11/1996 | Ruscitto | A47G 9/0253 112/475.08 |
| 6,342,456 | B1 | 1/2002 | Jenkins | |
| 6,588,840 | B1 * | 7/2003 | Lombardo | A47C 1/16 297/188.08 |
| 6,812,172 | B2 | 11/2004 | Hayes | |
| 6,863,697 | B2 | 3/2005 | McDaniel | |
| 6,908,869 | B2 | 6/2005 | Haun | |
| D532,641 | S | 11/2006 | Springer | |
| 8,464,376 | B1 | 6/2013 | Waite | |
| 2003/0097713 | A1 * | 5/2003 | Kinchen | A47C 16/04 5/652 |

(Continued)

*Primary Examiner* — Syed A Islam

(74) *Attorney, Agent, or Firm* — Randal Homburg

(57) ABSTRACT

A slipcover applied over a cushion or pillow for outdoor use using a durable textured fabric made of a combination of synthetic blend fibers engineered to stretch without using elastomeric or hyper-stretch yarns, each slip cover defining an envelope having an upper opening within which a cushion is inserted, the slip cover having a first and second closure flap which are applied over the upper opening, sealing the cushion within the envelope, the first and second enclosure pocket applied one over the other, or vice versa, providing the slipcover with two different selected smooth exposed outer surfaces.

5 Claims, 3 Drawing Sheets

(56) References Cited

U.S. PATENT DOCUMENTS

2004/0155499 A1 8/2004 Chambers
2014/0042786 A1 2/2014 Miller
2015/0123439 A1 5/2015 Jordan

* cited by examiner

OUTDOOR CUSHION SLIPCOVER SLEEVE

CROSS REFERENCE TO RELATED APPLICATIONS

Applicant claims the benefit of Provisional Patent Application No. 62/070,931, filed on Sep. 9, 2014, by the same inventor

BACKGROUND OF THE INVENTION

1. Field of Invention

A reversible and washable stretch slipcover for outdoor use provides a mechanical stretch knit fabric without elastomeric or hyper-stretch yarns or mechanical closures, having a fabric resistant to insect damage, moisture, mold, rot, mildew, heat, deformation and fading from exposure to UV light.

2. Description of Prior Art

A preliminary review of prior art patents was conducted by the applicant which reveal prior art patents in a similar field or having similar use. However, the prior art inventions do not disclose the same or similar elements as the present outdoor fabric slip cover, nor do they present the material components in a manner contemplated or anticipated in the prior art.

U.S. Pat. No. 6,342,456 to Jenkins, Jan. 29, 2002, discloses a fabric made for outdoor use having fibers made of polypropylene, UV inhibitor and fluorochemicals. The patent is directed to a manufacturing method. The present disclosed fabrics includes an alcohol and an ester and other chemical compounds as indicated in the 20% long-chain polymer. U.S. Pat. No. 6,812,172 to Hayes, Nov. 2, 2004 is a treatment for yarn in acid for wicking and dye enhancement. U.S. Pat. No. 6,863,697 to McDaniel, Mar. 8, 2005, is a treatment for splittable yarns to an acid treatment and a basic treatment to remove a portion of the polyamide making it more hydrophillic, kind of like the patent above.

U.S. Pat. No. 6,908,869 to Haun, Jun. 21, 2005, demonstrates a stretchable woven fabric using elastomeric yarn with spun acrylic, polyester, nylon yarn, texturized filament yarns or other uncoated filament yarns. A list of the yarns used are found in the claims and in column 2 of the specification and do not include those materials as disclosed in the present fabric. A pillow cover, FIGS. 1-4, show a partial overlap portion on a pillow cover but it contains no ties or apertures through which to pass the ties, in U.S. Pat. No. 8,464,376 to Waite, Jun. 18, 2013. A fold-close pillow cover is disclosed in U.S. Pat. No. 2,895,146 to Lester, Jul. 21, 1959. It does not indicate any particular fabric composition and does not have any weather or UV resistant characteristics disclosed in its claims or specification. It also lacks the closure method as the present slip cover, where both enclosures are actively engaged and effective at the same time.

Another cover is disclosed for outdoor application in U.S. Patent App. No 2014/0042786 to Miller with fasteners on opposite edges to wrap beneath a cushion and secures the opposite edges together. At the lateral edges are additional fasteners for alternative trim edging. This cover uses a different fabric composition and does not envelope the entire cushion, instead leaving a bottom opening and is not disclosed as being inverted.

An outdoor cushion cover sleeve is disclosed in U.S. Patent App. No 2015/0123439 to Jordan demonstrating an outdoor cushion sleeve having an opening with a short flap and a long flap, each with a strip of fasteners to enclose the cushion and only claiming one side of the cover. This is distinguished from the present invention enclosing the cushion without fasteners and being custom fitted to the cushion without significant deformation or stretch and employs both sides of the fabric for reversible selection. A waterproof cushion is disclosed in U.S. Pat. No. 4,295,235 to Deitz but fails to disclose an exterior cushion slipcover which is applied over an old cushion as a replacement.

SUMMARY OF THE INVENTION

Outdoor cushions are used with outdoor furniture and generally comprise some type of padding surrounded by a permanent or removable slip cover. Most commonly, these are covered with a type of fabric intended for outdoor use. The outdoor fabrics of today are greatly improved providing a more comfortable feel and longer UV and stain resistance, but they still become worn, faded and out of date in color or pattern—all resulting in these cushions being undesirable and thrown away. Using the current outdoor fabrics as slipcovers in not a generic option as these fabrics are woven and have little to no stretch lending them custom made to exact size original coverings or expensive, time consuming custom recovering which, due to the high cost and time investment, encourages replacement of the entire cushion, cover and all. The present slipcover also extends the useful life of the cushions, reducing the number of times outdoor furniture cushions are thrown away as waste.

The present fabric covers provide an invertible cushion cover constructed of a synthetic blend of a mechanical stretch fabric resistant to heat, sun, moisture and other degrading fabric elements that is both fade resistant and durable. The fabric is engineered for mechanical stretch alleviating the need for mechanical closures. The fabric slipcover utilizes dual pocket closures, tie straps, tie strap apertures and is provided in various shapes and sizes to cover cushions, pillows, pads and covers for several embodiments and types of outdoor furnishings, some having the ties and aligned apertures and some embodiments without ties.

The present invention relates to a covering for outdoor furniture cushions and decorative pillows. More specifically, the present invention pertains to an improved outdoor slipcover or sock for individual loose cushions and pillows of outdoor furniture pieces. The knitted slipcover is designed to fit cushions of various sizes and shapes, conforming closely with the item covered with some degree of stretch without deformation. It is invertible and washable using a heavy weight synthetic fiber blend knit fabric having some mechanical stretch without elastomeric or hyper stretch yarns or mechanical closures. The chemical composition of the fibers used in the fabric provide durability and resistance to insect damage, moisture, mold, rot, and exposure to UV light degradation. The slipcover fabric face is engineered to have a similar look and feel of a boucle or French terry loop and may be knitted in solids, stripes or jacquards.

DESCRIPTION OF THE DRAWINGS

The following drawings are submitted with this utility patent application.

DESCRIPTION OF THE PREFERRED EMBODIMENT

Figure 1:
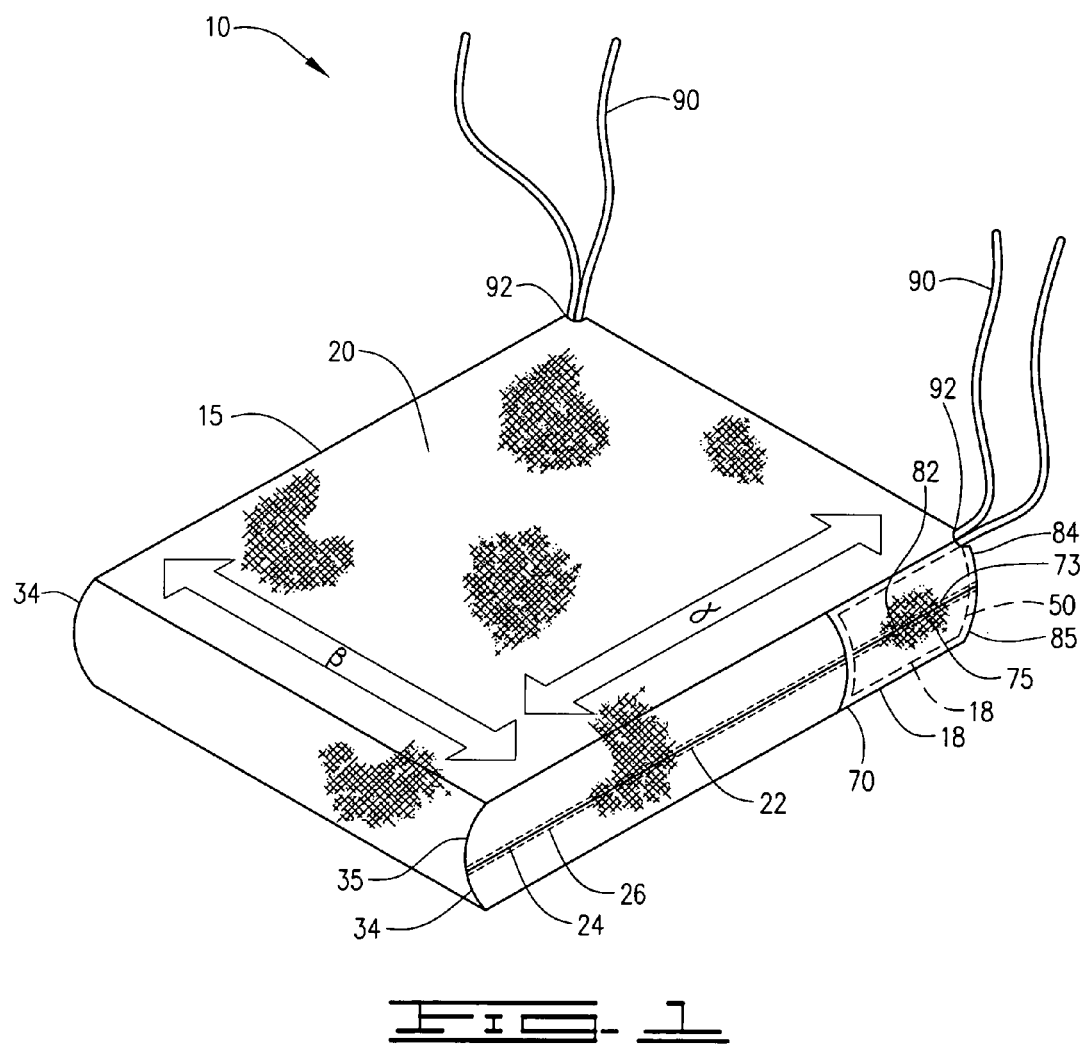
FIG. 1 is an illustration of an embodiment of a slip cover indicating weft and warp.

A washable stretch slip cover 10 for outdoor use utilizes a mechanical stretch fabric which contains no hyper-elastic or elastomer yarns withstanding exposure to longer periods of heat, sunlight and weather elements, as shown in FIGS. 1-5, comprising one continuous length of fabric panel 15 having a body 20, a first pocket enclosure 50 and a second pocket enclosure 70, each at opposing ends 18 of the panel 15, each pocket enclosure 50, 70 defining folded flap portion 52, 72, and a base portion 54, 74, forming an enclosure pocket 60, 80, and a pocket opening 63, 83, each pocket enclosure 50, 70, formed by the folded edges 53, 55, 73, 75, of the folded flap portion 52, 72, and base portion 54, 74, sewn together respectively forming a pocket side seam 62, 82, and pocket end corners 64, 84, each enclosure pocket 50, 70, being formed in an identical size and shape, with the body 20 further defining a body side seam 22 comprising an outer margin 24 of the remaining fabric panel 15 along a folded edge 26 which is excluded from the first and second pocket enclosures 50, 70, the body 20 forming a cushion cavity 30 and body corners 34, wherein a conforming shaped cushion 100, covered or uncovered, is inserted into the cushion cavity 30 and one of the pocket enclosures, 50 or 70, is placed over the exposed end of the inserted cushion 100, after which the other pocket enclosure, 70 or 50, is applied over the cushion-containing pocket enclosure 30, sealing the cushion 10 entirely within the slip cover 10.

In this closure application, the one continuous length of fabric may have one fabric print on one surface and a second fabric print on the opposing surface. This provides the slip cover with a reversible ability, with the user choosing the desired outer surface for use. In defining the amount of fabric folded over to compose each enclosure pocket 50, 70, the folded flap portion 52, 72, of the each enclosure pocket 50, 70, would be of a length to provide stability and security to maintain the cushion within the slip cover without slippage or shift during containment and use. It has been found that the length $\Delta$ of the folded flap portion, 52, 72, would be no less than 25% of the length $\theta$ of the body 20 and/or cushion cavity 30 in order to perform this desired optimal functional purpose.

Figure 2:
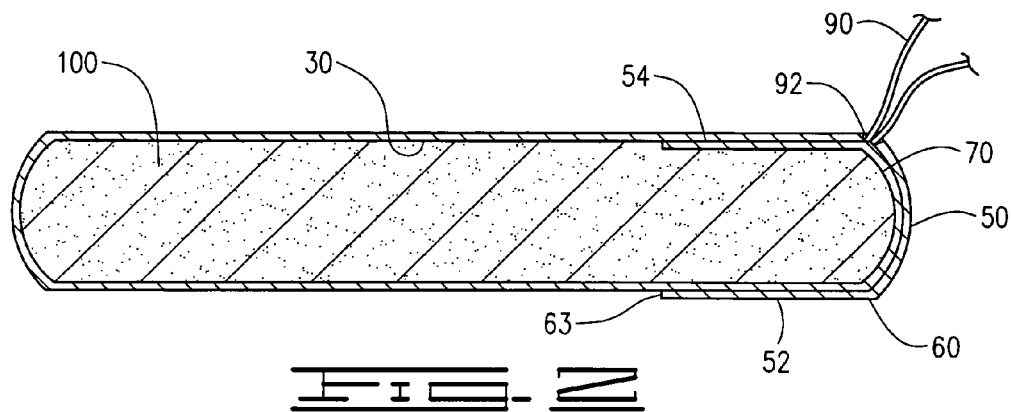
FIG. 2 is a cross-sectional illustration of the slip cover with ties extending from corners of the second pocket enclosure and placed through the apertures in the first pocket enclosure, with the first pocket enclosure over the second pocket enclosure.
Figure 3:
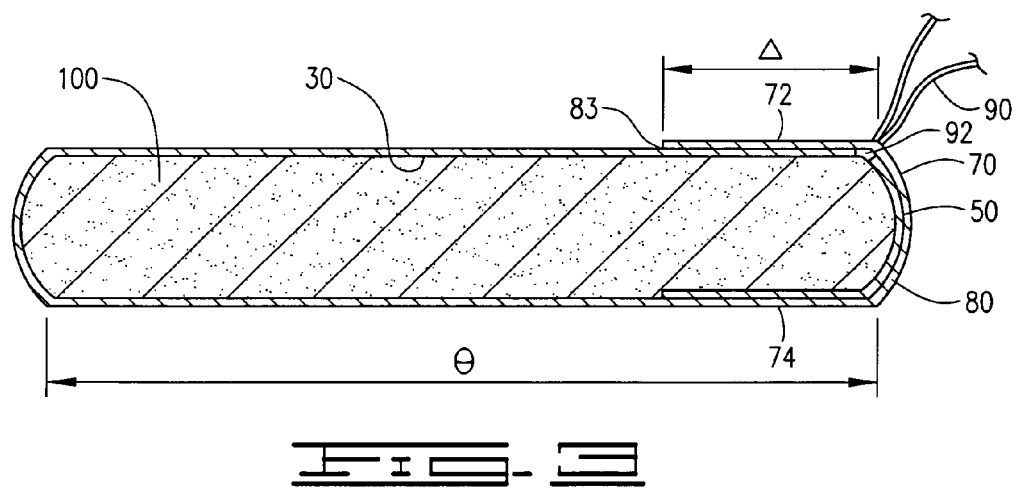
FIG. 3 is a drawing of the slip cover with tie straps with the pocket enclosures reversed.
Figure 4:
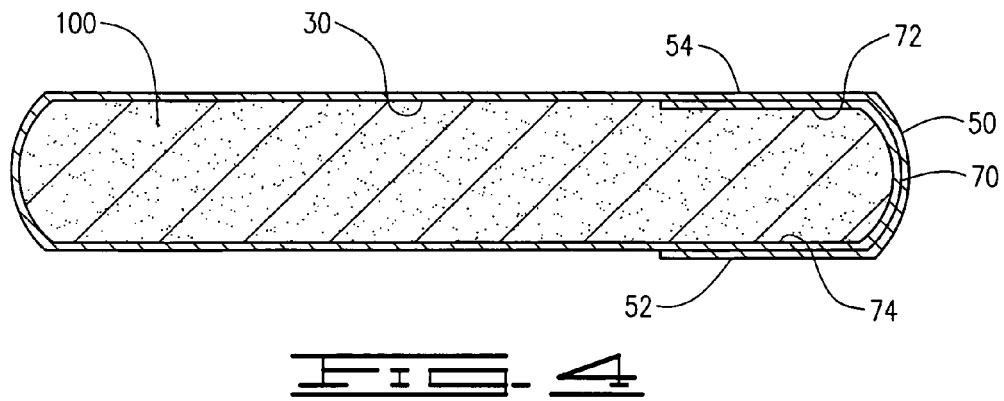
FIG. 4 is a cross sectional illustration of the slip cover with no ties.

The preferred embodiment utilizes one continuous length of fabric forming the body 20 of the slipcover, two identically sized enclosure pockets 50, 70, at the opening of the cushion cavity 30, the body joined with two opposing side seams 22 and small shaping darts 35 at each body end corner 34, FIG. 1. This embodiment reduces sewn seams, an inherently weakened component, to a minimum, while providing seamless edges, creating a smooth custom fit look. Some of the embodiments may use self knitted ties 90 attached at various locations, depending on the style of cushion being covered, to secure the slip-covered cushion to the furniture piece. When the ties 90 are attached at the corners 64, 84, of one of the slipcover's enclosure pockets 50, 70, the opposite pocket enclosure will contain an aligned aperture 92 through which the ties 90 may extend, depending on the manner in which the closures are applied. These ties 90 are applied as shown in FIGS. 2 and 3, and attached to the pocket end corners 64, 84, of either the first or second enclosure pockets 50, 70. The ties 90 may also be omitted, FIG. 4, which may be the case when utilizing the slip cover for seat backs, ottomans, and one piece seat or lounge cushions, poufs, floor cushions and decorative pillows. The ties 90 may also be included within two shaping darts 65, 85, within the corners 64, 84, on the outside of the pocket enclosures after the shaping darts are included to neatly define the corners. It may also be preferred to incorporate the ties 90 and aligned apertures 92 within the pocket side seams 62, 82, for ease of manufacture of the slip cover 10, especially since it is made of one continuous length of fabric panel 15. When the enclosure pockets 50, 70 are folded in reverse order, these same ties 90 may be passed through each tie aperture 92 in the pocket enclosure corners 64, 84, while anchored to the other pocket enclosure corners 64, 84, allowing the passage of the ties 90 to be still be affixed to the applied furniture, FIG. 2. The ties 90 may also be hidden and kept within the slip cover 10 if the user chooses not to use them.

The preferred fabric used in the slip cover 10 is a uniform blend of synthetic fibers with a textured surface similar to Boucle or French terry loop fabric which is soft against the skin. Preferably, the fabric is a 20/80 percent synthetic blend, with the 20 percent factor being a long-chain polymer of which at least 85% by weight is an ester, de-hydric alcohol, and teriphthalic acid and the 80 percent is a long-chain polymer composed of at least 85% by weight acrylonitrile monomer units, both of these fibers suited for outdoor use being by their chemical nature resistant to insect damage, moisture, mold, rot and mildew as well as fade resistant and durable. The fabric contains no elastomeric yarns, the elastomeric or SPANDEX® yarns being less resistant to prolonged exposure to UV light and heat. The noted fabric blend is engineered for at least 25% or more mechanical stretch weft $\beta$ and at least 15% or more stretchable warp a allowing the slip covers to fit various sizes within each style. Weft $\beta$ is defined as the fabric capacity to stretch across the fabric, or side-to-side, and warp a is the fabric capacity to stretch along the fabric, or top-to-bottom, as indicated in FIG. 1. The 80% portion of the fabric composition will be either solution/dope dyed fiber extruded into yarn or yarn dyed, the solution/dope dyed yarn being suited for longer periods of full sun exposure and the yarn dyed fibers used for partial sun or covered patio use. The degree of stretch of the material will allow a close conformation of the fabric slip cover to the cushion.

Figure 5:
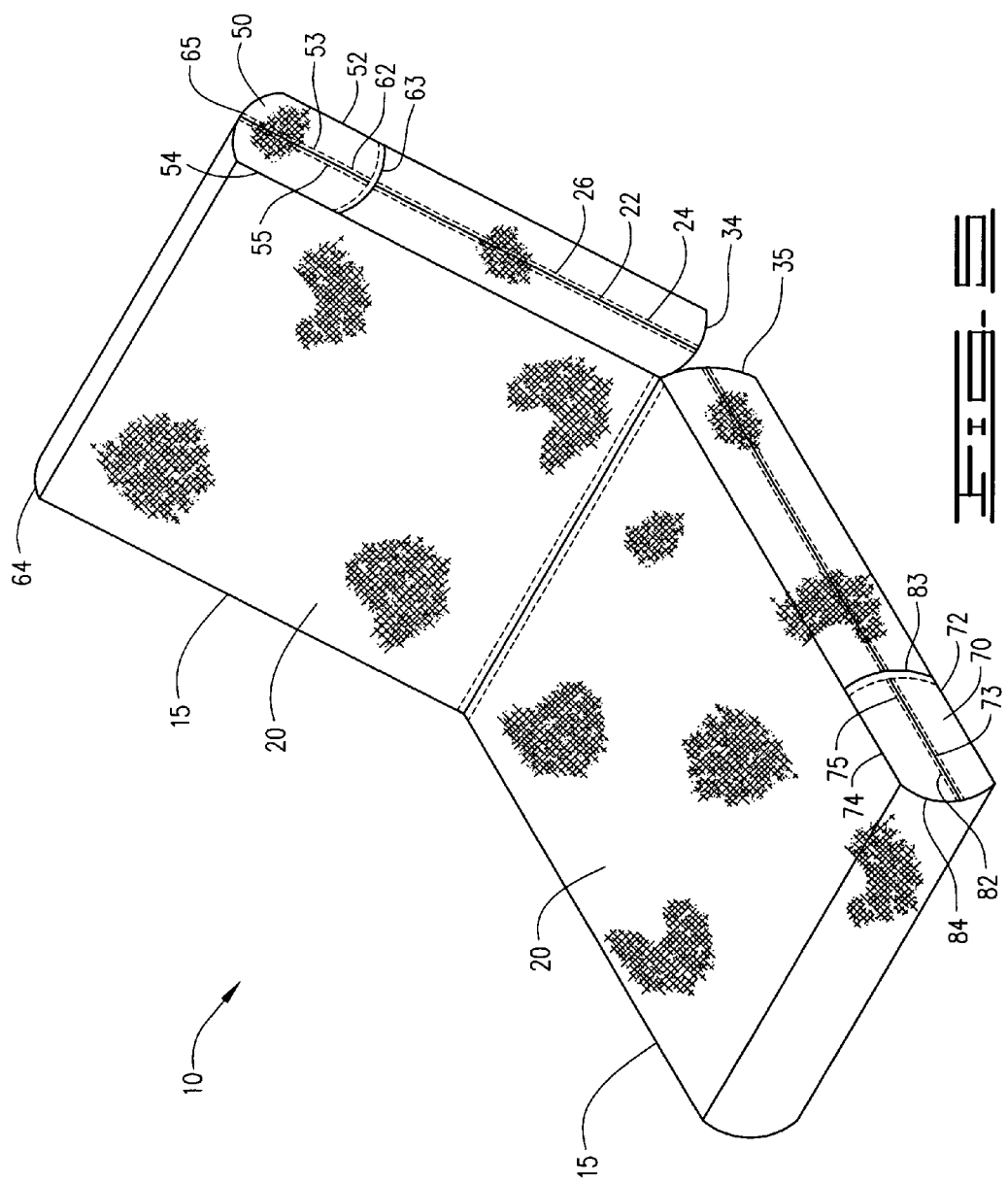
FIG. 5 is a drawing of the slip cover for a chaise lounge chair, having a double cushion and double closure.

The slip covers 10 are made for various types of furniture employing individual loose cushions, including patio chairs, dining chairs, chaise lounge chairs with a single cushion or multiple folding cushion panels, ottomans, throw pillows, bench cushions, poufs, floor cushions and sofas, FIGS. 1 and 5. There are no mechanical closures, metal components in the slip covers, or hook and loop materials which can damage, tear or adhere to the textured face of the fabric.

The cost of replacing outdoor cushions can come close to the original purchase price of the furniture itself and as the outdoor furniture market has grown to a multibillion dollar a year industry, the need for viable alternatives to replacing outdoor cushions entirely becomes ever more important. Prolonging the useful life of outdoor cushions provides a two fold benefit. First, the customer is allowed a convenient and inexpensive opportunity to enhance the look of their current patio furniture. Second, the consumer may delay the disposal of the non-environmentally friendly foam products into our overburdened disposal sites.

Beyond the obvious expense of replacing worn, dirty or outdated outdoor furniture cushions, the consumer has the difficult task of finding a cushion or recovering a cushion with the correct size and shaped slipcover. Outdoor cushions within the same category of furniture including dining chairs, deep seat chairs, love seats, sofa, ottomans, and sun loungers are all similar, but differ in size by several inches in width, height or depth, making it nearly impossible to slipcover outdoor cushions with a generic product. Because of this size specific problem, replacement store bought outdoor slipcovers offered in the public market place are usually brand specific. By the inclusion of the fabric engineered with enough mechanical stretch to allow each style of slipcover to fit most cushions within a category as well as the ability to add foam or padding if needed to make the cushion more comfortable or attractive. The heavy weight and textured surface of the fabric slipcover disguises and smooths the look of any surface imperfections, color or pattern of the existing cushion, thereby making it preferred to leave the existing cushion covers in place, greatly enhancing the outdoor slipcover's ease of use, being applied over the old cushion and cover.

While the invention has been particularly shown and described with reference to a preferred embodiment thereof, it will be understood by those skilled in the art that changes in form and detail may be made therein without departing from the spirit and scope of the invention.

What is claimed is:

1. A washable stretch slip cover provided as one continuous length of fabric panel for outdoor use utilizes a mechanical stretch fabric which contains no hyper-elastic or elastomer yarns withstanding exposure to longer periods of heat, sunlight and weather elements, said slip cover comprising:
   a body defining a cushion cavity and body corners;
   a first pocket enclosure and a second pocket enclosure, each said pocket enclosure at opposing ends of said fabric panel, each said pocket enclosure defining a folded flap portion, a base portion forming an enclosure pocket and a pocket opening, each said pocket enclosure formed by folded edges of said folded flap portion and said base portion sewn together respectively forming a pocket side seam and pocket end corners, each said enclosure pocket defining an identical size and shape, said body further defining a body side seam comprising an outer margin of said remaining said fabric panel along a folded edge which is excluded from said first and second pocket enclosures, wherein a conforming shaped cushion, covered or uncovered, is inserted into said cushion cavity, one said pocket enclosure being placed over said cushion within said cushion cavity, and said other pocket enclosure is applied over said pocket enclosure already over said cushion, sealing said cushion securely and entirely within said slip cover with each said pocket enclosure flap portion extending over said cushion to prevent exposure of said cushion to weather or elements and protect said cushion.

2. The slip cover as disclosed in claim 1, further comprising:
   said pocket enclosure flap portion defining a length subsequent to placement over said cushion of approximately 25% of a length of said body.

3. The slip cover as disclosed in claim 1, further comprising:
   said body corners forming shaping darts;
   said pocket end corners forming shaping darts; and
   knitted ties extending from said first pocket enclosure of said slip cover, with said second pocket enclosure providing apertures aligning with said knitted ties through which said knitted ties may be passed, said knitted ties being provided to secure said slip cover containing said cushion to outdoor furniture.

4. The slip cover as disclosed in claim 1, wherein said slip cover fabric panel is a uniform blend of synthetic fibers with a textured surface, similar to Boucle or French terry loop fabric, which is soft against the skin, comprising a 20/80 percent synthetic blend, with said 20 percent factor being a long-chain polymer of which at least 85% by weight a mixture of an ester, de-hydric alcohol, and teriphthalic acid and said 80 percent factor is a long-chain polymer composed of at least 85% by weight acrylonitrile monomer units, both of these fibers suited for outdoor use being by their chemical nature resistant to insect damage, moisture, mold, rot and mildew as well as fade resistant and durable.

5. The slip cover, as disclosed in claim 1, wherein said slip cover fabric panel contains no elastomeric yarns, the elastomeric or yarns being less resistant to prolonged exposure to UV light and heat with said fabric panel engineered for at least 25% or more mechanical—stretch weft and at least 15% or more stretchable warp, allowing said slip covers to fit various sizes within each style, weft being defined as the capacity of said fabric panel to stretch across the cushion, or side-to-side, and warp being defined as the capacity of said fabric panel to stretch across said cushion along its length, or top-to-bottom, said warp and weft stretch capability allowing a close conformation of said slip cover to said cushion, said fabric panel further comprising at least 80% a solution/dope dyed fiber extruded into yarn or yarn dyed, with said solution/dope dyed fiber yarn suited for longer periods of full sun exposure and said yarn dyed fibers used for partial sun or covered patio use.

* * * * *